United States Patent [19]

Takahashi et al.

[11] Patent Number: 4,862,579
[45] Date of Patent: Sep. 5, 1989

[54] APPARATUS FOR ADHERING RIBBONS TO CARTRIDGE SHELL PLATE

[75] Inventors: Koichi Takahashi; Kazuo Okutsu, both of Kanagawa; Yoshihiro Ide, Tokyo; Hiroshi Takei; Yukio Ishida, both of Kanagawa; Kazumasa Harada, Shizuoka, all of Japan

[73] Assignee: Fuji Photo Film Co., Ltd., Kanagawa, Japan

[21] Appl. No.: 98,656

[22] Filed: Sep. 18, 1987

[30] Foreign Application Priority Data

Sep. 18, 1986 [JP] Japan .................. 61-219942
Sep. 30, 1986 [JP] Japan .................. 61-231422
Sep. 30, 1986 [JP] Japan .................. 61-231423

[51] Int. Cl.$^4$ .................. B23Q 7/00; B32B 31/04
[52] U.S. Cl. .................. 04862567729/; 156/552
[58] Field of Search .................. 29/561, 564, 564.1, 29/806, 33 P; 156/552, 301, 302, 303

[56] References Cited

U.S. PATENT DOCUMENTS

| | | | |
|---|---|---|---|
| 3,364,551 | 1/1968 | Napor et al. .................. | 29/564.1 X |
| 3,758,367 | 9/1973 | Berg .................. | 156/552 X |
| 4,087,312 | 5/1978 | Maltese .................. | 156/552 |
| 4,364,787 | 12/1982 | Raozins .................. | 156/552 X |
| 4,404,720 | 9/1983 | Bohannon .................. | 29/564.1 |
| 4,614,019 | 9/1986 | Shimizu et al. .................. | 29/806 X |
| 4,680,079 | 7/1987 | Tanaka .................. | 156/552 X |

FOREIGN PATENT DOCUMENTS

| | | | |
|---|---|---|---|
| 77949 | 6/1980 | Japan .................. | 29/806 |
| 143841 | 8/1984 | Japan .................. | 29/806 |

Primary Examiner—William R. Briggs
Attorney, Agent, or Firm—Sughrue, Mion, Zinn, Macpeak, and Seas

[57] ABSTRACT

An apparatus for adhering ribbons to a cartridge shell plate comprises a conveyor for continuously conveying thin sheets disposed side by side, a pressure adherence unit for pushing two ribbon webs coated with an adhesive against edge portions of the thin sheets which are being conveyed, and a ribbon cutting mechanism for circulating cutter units beside the thin sheets in the direction of conveyance of the thin sheets in synchronization therewith, and swinging cutters of the cutter units to cut the ribbon webs between adjacent thin sheets. The cartridge shell plate is made by intermittently conveying thin sheets, which have been cut in a size equal to the developed length and width dimensions of the cartridge shell plate, by a conveyor, and cutting four corner portions of the thin sheet and then bending the thin sheet into a ship-like cross-sectional shape at a cutting process station and a bending process station disposed along the conveyor.

5 Claims, 6 Drawing Sheets

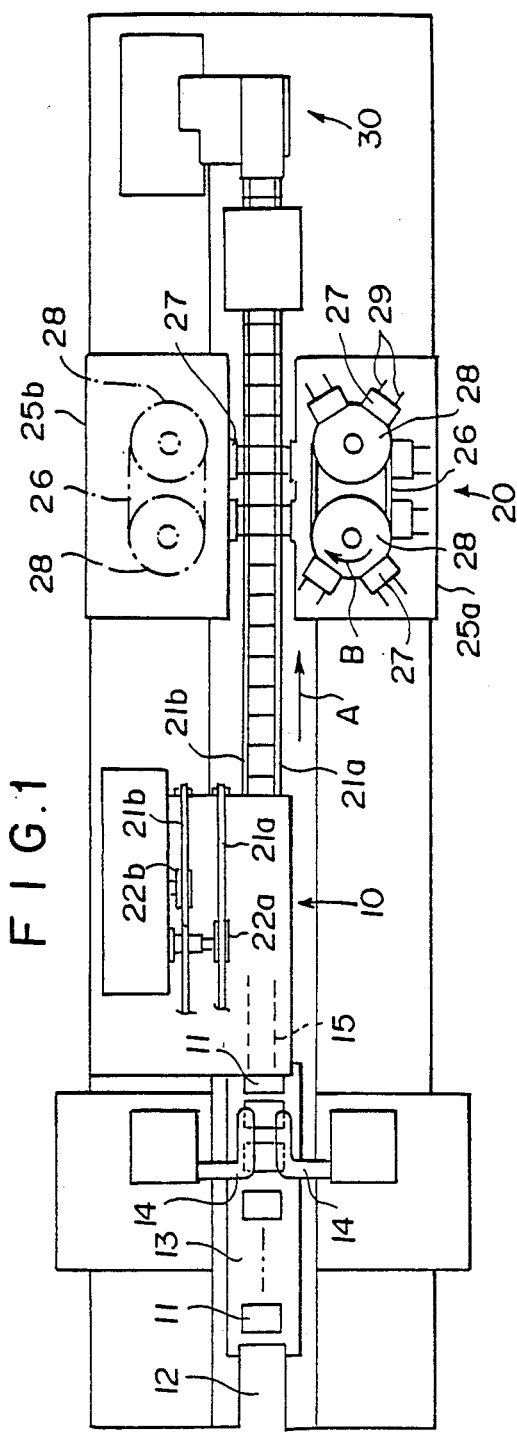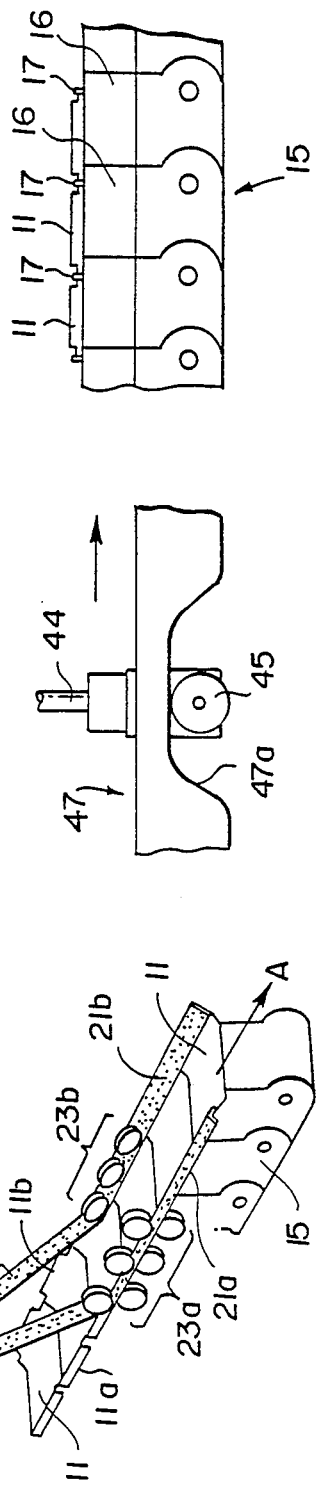

FIG. 12
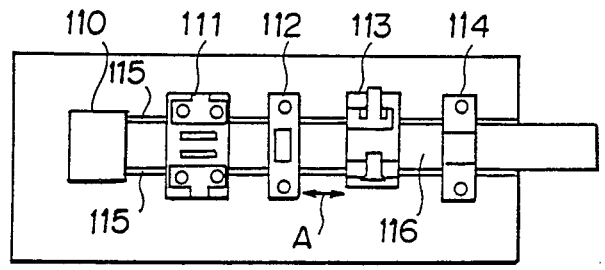
FIG. 13
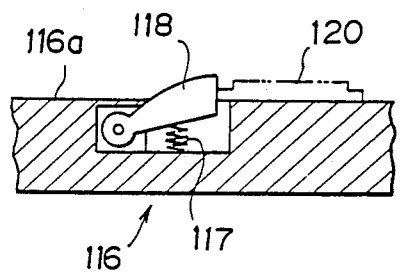
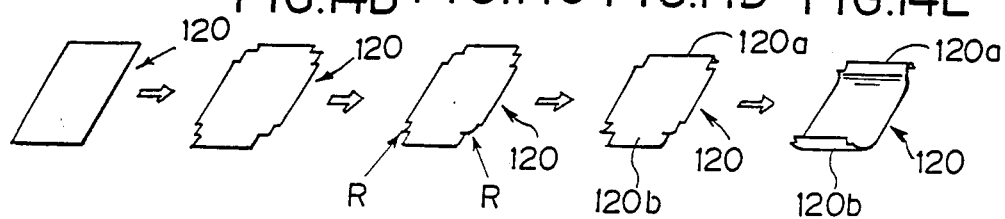

APPARATUS FOR ADHERING RIBBONS TO CARTRIDGE SHELL PLATE

BACKGROUND OF THE INVENTION

1. Field of the Invention

This invention relates to an apparatus for adhering ribbons to a shell plate of a cartridge for housing a photographic roll film. This invention also relates to an apparatus for making a cartridge shell plate, and a method of making a cartridge shell plate.

2. Description of the Prior Art

Photographic roll films such as 35 mm roll films are utilized in the form housed in a cartridge. As is well known, the cartridge is basically composed of a shell plate, a spool housed inside of the shell plate, and caps for closing the upper and lower end portions of the shell plate. Also, light-shielding velvet ribbons are adhered to inner surfaces of a film pulling outlet of the shell plate. As disclosed in, for example, Japanese Unexamined Patent Publication No. 59(1984)-143841, the velvet ribbons are adhered to both end portions of a thin sheet constituting the shell plate before the thin sheet is bent into a cylindrical shape.

Adherence of the velvet ribbons to the thin sheet has heretofore been carried out by cutting in advance a velvet ribbon web into predetermined lengths to prepare the velvet ribbons, intermittently conveying the thin sheet, and adhering the cut velvet ribbons one after another to the thin sheet while the thin sheet is stationary. Also, an adherence method wherein adherence can be achieved more quickly has been put into practice. In this adherence method, a plurality of thin sheets are conveyed continuously so that the leading edge of each thin sheet almost contacts the trailing edge of the preceding thin sheet, two continuous length velvet ribbon webs are continuously adhered to right and left edge portions of the thin sheets, and then a cutter is inserted between adjacent thin sheets to cut the ribbon webs.

However, with the aforesaid method wherein the ribbons cut in advance are adhered one after another to the thin sheets, the small ribbons must be fed one after another, and conveyance of the thin sheets must be stopped for adherence of the ribbons. Therefore, the adherence processing speed can be increased only up to, for example, approximately 40 sheets/minute.

Also, with the aforesaid method wherein continuous length ribbon webs are continuously adhered to a plurality of thin sheets and are then cut, the cutter must be moved reciprocally for cutting the ribbon webs. Therefore, the adherence processing speed is limited by the reciprocal movement of the cutter, and can be increased only up to, for example, approximately 150 sheets/minute.

SUMMARY OF THE INVENTION

The primary object of the present invention is to provide an apparatus for adhering ribbons to a cartridge shell plate, which carries out adherence of the ribbons very quickly.

Another object of the present invention is to provide an apparatus for making a cartridge shell plate, which enables reduction of the equipment cost, the operating cost and the personnel expenses.

The specific object of the present invention is to provide a method of making a cartridge shell plate, wherein a thin metal sheet as a material of the cartridge shell plate is utilized efficiently and the cartridge shell plate is formed accurately.

The present invention provides an apparatus for adhering ribbons to a cartridge shell plate wherein velvet ribbons are adhered to right and left edge portions of each of thin sheets which are to be bent to constitute cartridge shell plates, the apparatus for adhering ribbons to a cartridge shell plate comprising:

i) a conveyance means for continuously conveying a plurality of said thin sheets disposed side by side so that the leading edge of each of said thin sheets is adjacent to the trailing edge of the preceding thin sheet, (ii) a pressure adherence means for pushing two continuous length velvet ribbon webs, on which an adhesive has been applied, respectively against right and left edge portions of said thin sheets which are being conveyed, thereby to continuously adhere said velvet ribbon webs to said right and left edge portions of said thin sheets, and (iii) a ribbon cutting mechanism for circulating a plurality of cutter units so that said cutter units are moved beside said thin sheets, to which said velvet ribbon webs have been adhered, in the same direction as the direction of conveyance of said thin sheets in synchronization with said thin sheets, and swinging cutters of said cutter units, which are being moved in synchronization with said thin sheets, so that said cutters enter between the leading edge and the trailing edge of said thin sheets adjacent to each other and cut said velvet ribbon webs.

The present invention also provides an apparatus for making a cartridge shell plate, which comprises:

(i) a forming station for cutting thin metal sheets sequentially into a predetermined shape and thereafter bending said thin sheets so that they have an approximately ship-like cross-sectional shape, (ii) a feed means for intermittently feeding said thin sheets, which have been processed at said forming station, one after another out of said forming station while maintaining each of said thin sheets in predetermined orientation, and (iii) a ribbon adherence station for receiving said thin sheets fed out by said feed means, continuously conveying said thin sheets disposed side by side so that the leading edge of each of said thin sheets contacts or almost contacts the trailing edge of the preceding thin sheet, and adhering velvet ribbons respectively to right and left edge portions of each of said thin sheets.

The present invention further provides a method of making a cartridge shell plate, which comprises the steps of:

(i) intermittently conveying thin metal sheets, which have been cut so that each of said thin sheets has length and width dimensions equal to the developed length and width dimensions of a cartridge shell plate, one after another by a conveyance means, and (ii) cutting four corner portions of each of said thin sheets into predetermined shapes and then bending each of said thin sheets so that it has a predetermined, approximately ship-like cross-sectional shape at a cutting process station and a bending process station disposed along said conveyance means.

With the apparatus for adhering ribbons to a cartridge shell plate in accordance with the present invention wherein the cutter units are moved in synchronization with the thin sheets, cutting of the velvet ribbon webs can be carried out without stopping conveyance of the thin sheets, and therefore the processing speed for adherence of the velvet ribbons can be increased markedly to a rate within the range of, for example, approximately 500 to 600 sheets/minute. Accordingly, the apparatus for adhering ribbons to a cartridge shell plate in accordance with the present invention markedly contributes to improvement of productivity of the cartridge.

With the apparatus for making a cartridge shell plate in accordance with the present invention wherein the station for forming the thin metal sheets and the station for adhering velvet ribbons to the thin sheets are directly connected with each other by the feed means for feeding the thin sheets one after another by maintaining them in predetermined orientation, it is not necessary to provide a thin sheet stacking device, a conveyance device and a supply device between the two stations as in the conventional apparatus. Therefore, with the apparatus for making a cartridge shell plate in accordance with the present invention, the equipment cost, the operating cost and the personnel expenses in manufacturing of the cartridge can be reduced. As a result, reduction of the cost of the cartridge loaded with a roll film can be achieved.

Also, with the apparatus for making a cartridge shell plate in accordance with the present invention wherein the forming station and the ribbon adherence station are directly connected with each other, there is no risk of the thin sheets being damaged between the two stations as in the case where the thin sheets are stacked, conveyed and supplied between the two stations. Therefore, with the apparatus for making a cartridge shell plate in accordance with the present invention, productivity of the cartridge can be increased. This feature also contributes to reduction of the cost of the cartridge loaded with a roll film.

With the method of making a cartridge shell plate in accordance with the present invention wherein the thin sheets having the dimensions as defined above are used and the four corner portions of each of the thin sheets are cut into predetermined shapes, it is possible to eliminate the problem that a large area of the thin metal sheet is wasted as in the case of the conventional method wherein, as shown in FIG. 16, a thin metal sheet 50 larger than the developed dimensions of a cartridge shell plate as indicated by the broken line is punched out by use of a general-purpose pressing device 51 and is bent (as shown in FIG. 17, with the conventional method, bending is generally carried out up to the step of processing the thin sheet 50 to have an approximately ship-like cross-sectional shape and then velvet ribbons 52, 52 are adhered to right and left edge portions of the thin sheet 50). Therefore, with the method of making a cartridge shell plate in accordance with the present invention, the thin metal sheets as the materials for cartridge shell plates can be utilized efficiently, and the amount of the thin metal sheets used can be reduced as compared with the conventional method. As a result, reduction of the cost of the cartridge loaded with a roll film can be achieved.

Also, with the method of making a cartridge shell plate in accordance with the present invention wherein cutting of four corner portions of each thin sheet and bending of the thin sheet are carried out at independent work stations, the apparatus need not be greatly modified even though the shape of the formed cartridge shell plate is to be changed. Further, the processing conditions at one station can be adjusted to appropriate values independently of the other station, and therefore the cartridge shell plate can be formed accurately. Moreover, the cutting process and the bending process are separate from each other, a single die may be used for each process, and expensive dies, e.g. progressive dies, need not be used. Also, the use of a feed bar in the present invention enables increase of the processing speed.

BRIEF DESCRIPTION OF THE DRAWINGS

FIG. 1 is a plan view showing an embodiment of the apparatus for adhering ribbons to a cartridge shell plate in accordance with the present invention, FIG. 2 is a perspective view showing the pressure adherence unit for adhering velvet ribbon webs in the embodiment shown in FIG. 1, FIGS. 3 and 4 are a plan view and a partially cutaway elevational view showing the ribbon cutting mechanism in the embodiment shown in FIG. 1, FIG. 5 is a side view showing a part of the ribbon cutting mechanism, FIG. 6 is a side view showing the thin sheet conveyance means in the embodiment shown in FIG. 1, FIGS. 7 and 8 are a plan view and a side view showing an embodiment of the apparatus for making a cartridge shell plate in accordance with the present invention, FIG. 12 is a plan view showing an example of the apparatus for carrying out an embodiment of the method of making a cartridge shell plate in accordance with the present invention, FIG. 13 is a sectional side view showing a part of the thin sheet conveyance means in the apparatus shown in FIG. 12, FIGS. 14A to 14E are perspective views showing the steps of forming the cartridge shell plate by the method of making a cartridge shell plate in accordance with the present invention.

DESCRIPTION OF THE PREFERRED EMBODIMENTS

The present invention will hereinbelow be described in further detail with reference to the accompanying drawings.

Figure 3:
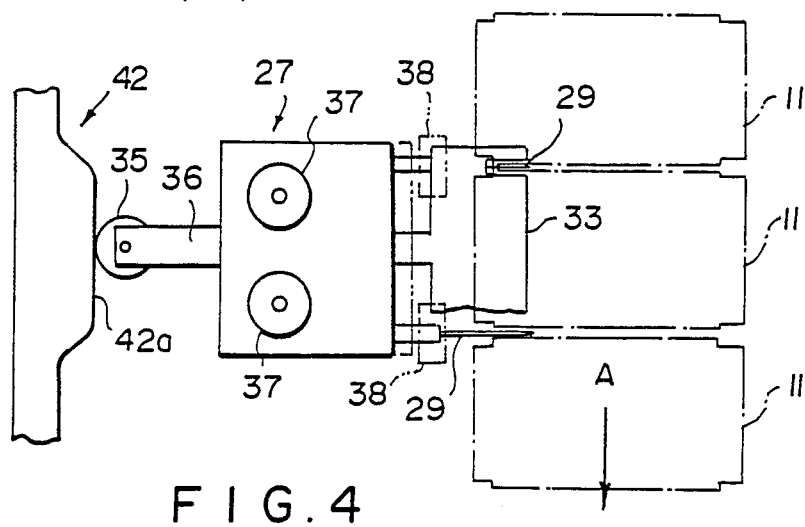
Figure 4:
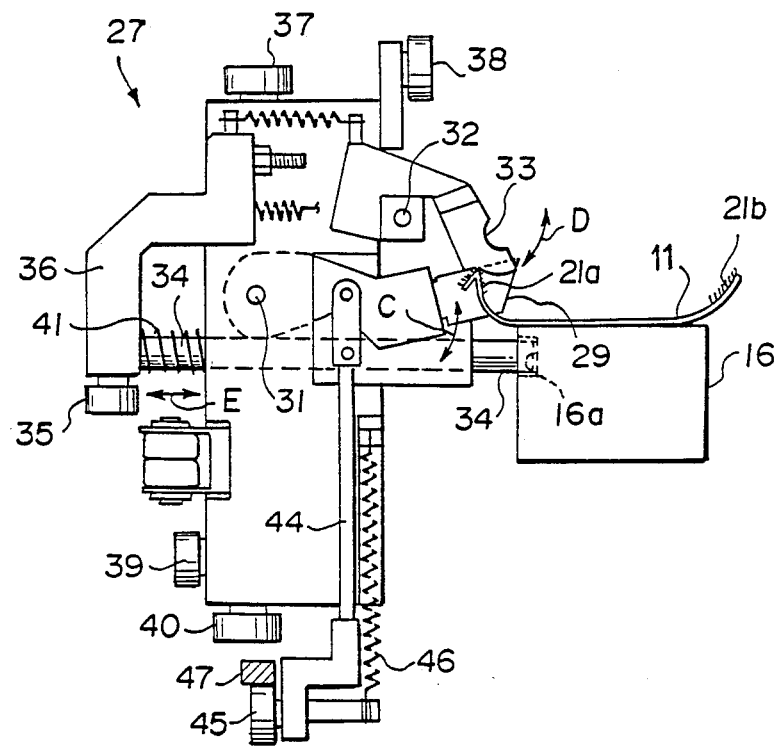

FIG. 1 shows an embodiment of the apparatus for adhering ribbons to a cartridge shell plate in accordance with the present invention, FIG. 2 shows a pressure adherence unit 10 in the embodiment shown in FIG. 1, and FIGS. 3 and 4 show in detail the major part of a ribbon cutting unit 20 in the embodiment shown in FIG. 1. Thin metal sheets 11, 11, ... which are to be bent into a cylindrical shape for use as cartridge shell plates have in advance been printed, painted, cut into a predetermined shape, and formed to have an approximately ship-like cross-sectional shape as shown in FIG. 2. As shown in FIG. 1, the thin sheets 11, 11, ... formed in this manner are supplied one after another from a supply unit 12 onto a conveyance means 13 constituted by a belt conveyor or the like. At this time, each of the thin sheets 11, 11, ... is supplied so that the surface constituting the inner circumferential surface when the thin sheet 11 is bent into a cylindrical shape faces up. In the course of conveyance of the thin sheets 11, 11, ... by the conveyance means 13, the thin sheets 11, 11, ... pass below a pair of high-frequency heaters 14, 14, and left and right edge portions of the thin sheets 11, 11, ..., i.e. the upper and lower edge portions thereof in FIG. 1, are heated by the heaters 14, 14.

The heated thin sheets 11, 11, ... are placed one after another on a continuously operated bucket conveyor 15 which conveys them in the direction as indicated by the arrow A from a pressure adherence unit 10 to a stacking unit 30 via a ribbon cutting unit 20. As shown in detail in FIG. 6, small-diameter claws 17, 17 protrude at right and left edge portions of the thin sheet supporting surface of each of buckets 16, 16, ... of the bucket conveyor 15. The positions of the thin sheets 11, 11, ... are determined by the claws 17, 17, ... so that the thin sheets 11, 11, ... are disposed side by side with a slight space intervening between the leading edge of each thin sheet 11 and the trailing edge of the preceding thin sheet 11, and the thin sheets 11, 11, ... are conveyed continuously in this condition. At the pressure adherence station 10, continuous length velvet ribbon webs 21a and 21b whose back surfaces have been coated with an adhesive are applied respectively on rollers 22a and 22b and tension rollers (not shown) or the like. The velvet ribbon webs 21a and 21b are stored in the form of rolls wound around supply shafts (not shown), and the leading end portions thereof are adhered to the right and left edge portions of the thin sheets 11, 11, ... in the direction as indicated by the arrow A. Adherence of the velvet ribbon webs 21a and 21b is effected by supplying the velvet ribbon webs 21a and 21b with the adhesive-coated surfaces facing down, pushing the velvet ribbon web 21a against the right edge portions 11a, 11a, ... of the thin sheets 11, 11, ... by rollers 23a, and pushing the velvet ribbon web 21b against the left edge portions 11b, 11b, ... of the thin sheets 11, 11, ... by rollers 23b. In this manner, the velvet ribbon webs 21a and 21b are adhered respectively to the right edge portions 11a, 11a, ... of the heated thin sheets 11, 11, ... and to the left edge portions 11b, 11b, ... thereof.

The continuous length velvet ribbon webs 21a and 21b adhered to the thin sheets 11, 11, ... in the manner as mentioned above are moved together with the thin sheets 11, 11, ... which are being conveyed. Therefore, the thin sheets 11, 11, ... conveyed one after another are connected together by the velvet ribbon webs 21a and 21b and fed into the ribbon cutting unit 20 in this condition. The ribbon cutting unit 20 is composed of a ribbon cutting mechanism 25a disposed beside the right edge portions 11a, 11a, ... of the thin sheets 11, 11, ... and a ribbon cutting mechanism 25b disposed beside the left edge portions 11b, 11b, ... of the thin sheets 11, 11, .... The ribbon cutting mechanisms 25a and 25b are symmetric in shape with respect to each other, and therefore cutting of the velvet ribbon webs 21a and 21b will be described below by taking the ribbon cutting mechanism 25a as an example. As shown in FIG. 1, the ribbon cutting mechanism 25a is provided with a loop-like chain 26, and a plurality of cutter units 27, 27, ... (by way of example, eight cutter units 27, 27, ... in this embodiment) disposed in an equally spaced relation to each other and coupled with the chain 26. The chain 26 is disposed so that it is parallel with the bucket conveyor 15 by the side of the thin sheets 11, 11, ... to which the velvet ribbon web 21a has been adhered. Also, sprocket wheels 28, 28 around which the chain 26 is wound are connected to, for example, a drive unit of the bucket conveyor 15 and are rotated continuously to move the chain 26 in the direction as indicated by the arrow B at a speed equal to the movement speed of the bucket conveyor 15. Therefore, the cutter units 27, 27, ... are moved beside the thin sheets 11, 11, ... in the same direction and at the same speed as the movement of the thin sheets 11, 11, .... Each of the cutter units 27, 27, ... is provided with two cutters 29, 29. While the cutter unit 27 is being moved beside each thin sheet 11 in synchronization therewith, the cutters 29, 29 are activated to cut the velvet ribbon web 21a at the leading edge and the trailing edge of the thin sheet 11. The operations of the cutters 29, 29 and the relevant parts will be described hereinbelow with reference to FIGS. 3 and 4.

FIG. 3 is a plan view of the cutter unit 27, and FIG. 4 is an elevational view of the same located beside the thin sheets 11, 11, ..., as viewed from the right side of FIG. 1. As shown in FIG. 4, each cutter 29 is swingable in the direction as indicated by the arrow C around a swing shaft 31. Also, the cutter unit 27 is provided with a work holder 33 swingable in the direction as indicated by the arrow D around a swing shaft 32. Also, the cutter unit 27 is provided with a locating pin 34 supported moveably in the direction as indicated by the arrow E (i.e. in the horizontal direction), and a rear end of the locating pin 34, i.e. the left end thereof in FIG. 4, is secured to a movement member 36 on which a roller 35 is supported rotatably. The path of movement of the cutter unit 27 is defined by movement defining rollers 37, 38, 39 and 40. The locating pin 34 is urged rearward by a spring 41, so that the roller 35 contacts a plate cam 42 as shown in FIG. 3. On the other hand, each cutter 29 is connected with a vertically extending connection member 44, a roller 45 is rotatably supported on the lower end portion of the connection member 44, and the connection member 44 is urged upward by a spring 46. Therefore, as shown in FIG. 5, the roller 45 contacts a bottom surface of a plate cam 47.

Slightly before the cutter unit 27 arrives at the ribbon cutting position, i.e. the position as shown in FIG. 3, the roller 35 advances onto a protrusion 42a of the plate cam 42. As a result, the locating pin 34 is moved toward the bucket conveyor 15 against the urging force of the spring 41, and the leading end portion of the locating pin 34 fits into a locating hole 16a of one of the buckets 16, 16, ..., thereby to ensure the movement of the cutter unit 27 in synchronization with the movement of the bucket 16. Also, as the locating pin 34 is moved in this manner, the movement member 36 moves toward the bucket conveyor 15. Therefore, the work holder 33 which has been maintained at the waiting position spaced upward from the thin sheet 11 is swung clockwise in FIG. 4, and holds the velvet ribbon web 21a from above. Thereafter, the cutter unit 27 arrives at the ribbon cutting position as shown in FIG. 3. At this time, the roller 45 enters a recess 47a of the plate cam 47. Therefore, the connection member 44 is moved up by the urging force of the spring 46, and the cutters 29, 29 which have been maintained at the waiting positions spaced downward from the thin sheet 11 are swung counter-clockwise in FIG. 4, enter between the thin sheet 11 and the adjacent thin sheets 11, 11, and cut the velvet ribbon web 21a at two positions. The cutter units 27, 27, . . . are secured to the chain 26 at intervals two times the array intervals of the thin sheets 11, 11, . . . . The cutter units 27, 27, . . . repeat the aforesaid operations one after another to cut the velvet ribbon web 21a at each of the thin sheets 11, 11, . . . . When the cutter unit 27 is moved together with the thin sheet 11 after the velvet ribbon web 21a has been cut by the cutter unit 27 in the manner as mentioned above, the cutters 29, 29 are moved down from the thin sheet 11 by the action of the plate cam 47, and the work holder 33 is moved up from the velvet ribbon web 21a. Thus the cutters 29, 29 and the work holder 33 return to their waiting positions. The other velvet ribbon web 21b is cut in the same manner as mentioned above by the ribbon cutting mechanism 25b.

The thin sheets 11, 11, . . . on which velvet ribbons formed by cutting from the velvet ribbon webs 21a and 21b are adhered to the right and left edge portions are conveyed by the bucket conveyor 15 to the stacking unit 30 and are stacked one upon another. The thin sheets 11, 11, . . . stacked in this manner are then bent into a cylindrical shape and supplied to a process for forming the cartridge shell plates.

An embodiment of the apparatus for making a cartridge shell plate in accordance with the present invention will hereinbelow be described with reference to FIGS. 7 to 10 and FIGS. 11A to 11D.

Figure 7:
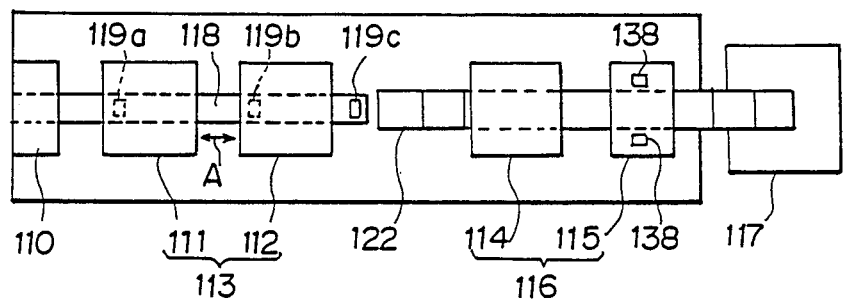
Figure 8:
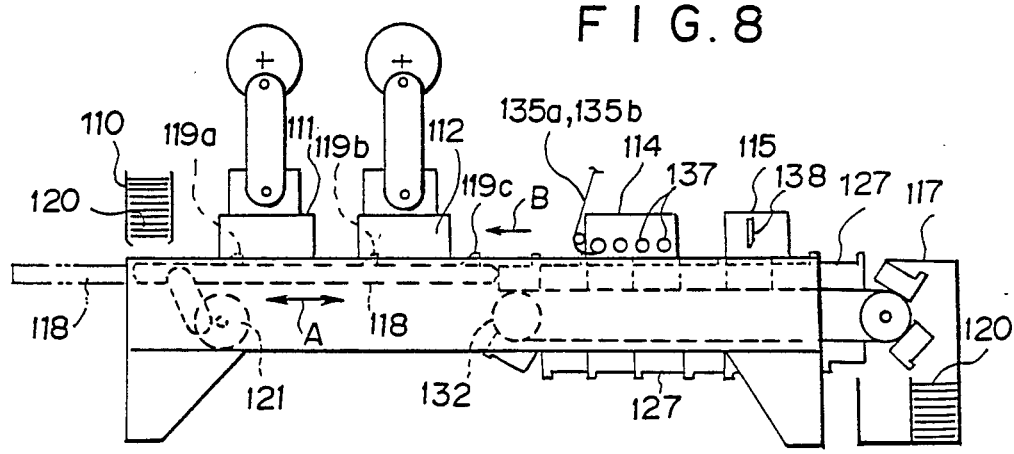

Referring to FIGS. 7 and 8, an embodiment of the apparatus for making a cartridge shell plate basically comprises a thin sheet supply unit 110, a forming station 113 composed of a press cutting unit 111 and a press bending unit 112, a ribbon adherence station 116 composed of an adherence unit 114 and a cutting unit 115, a stacking unit 117, and a feed bar 118 for feeding thin metal sheets 120, 120, . . . from the forming station 113 to the ribbon adherence station 116.

Figures 11A, 11B, 11C, 11D:
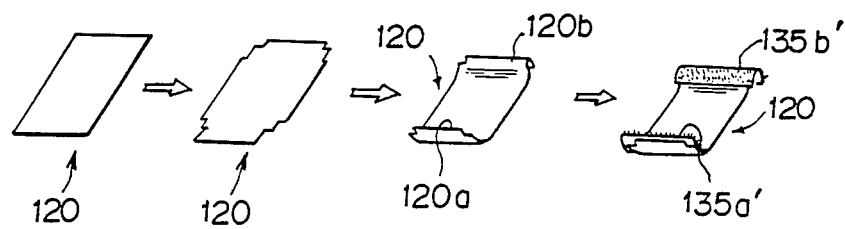

The feed bar 118 is provided on its upper surface with claws 119a, 119b and 119c disposed at predetermined intervals, and is intermittently reciprocated in the direction as indicated by the arrow A by a drive unit 121. A plurality of the thin metal sheets 120, 120, . . . are stacked in the thin sheet supply unit 110, and are supplied one after another onto the feed bar 118 by a known supply means (not shown) constituted by an air suction cup or the like. At the time one of the thin sheets 120, 120, . . . is supplied in this manner, the feed bar 118 is maintained stationary at the left end position in FIGS. 7 and 8 (i.e. at the position as indicated by the chain line in FIG. 8), and the thin sheet 120 is supplied to the forward side of the left claw 119a (i.e. to the right side thereof in FIGS. 7 and 8). As shown in FIG. 11A, the thin sheet 120 supplied onto the feed bar 118 in this manner has been cut into a rectangular shape so that the length and width dimensions thereof are equal to the developed length and width dimensions of the cartridge shell plate.

After the thin sheet 120 is supplied onto the feed bar 118, the feed bar 118 is moved forward by a predetermined distance. As a result, the thin sheet 120 which has been supplied to the forward side of the claw 119a is pushed and moved forward by the claw 119a, and is stopped at a predetermined position in the press cutting unit 111. At this time, the thin sheet 120 which has been supplied previously to the aforesaid thin sheet 120 supplied to the forward side of the claw 119a is fed by the claw 119b from the press cutting unit 111 to the press bending unit 112. Also, the thin sheet 120 which has been supplied previously to the thin sheet 120 supplied to the forward side of the claw 119b is transferred from the press bending unit 112 onto a bucket conveyor 122 as will be described in detail later. The press cutting unit 111 is constituted by a known pressing device, and cuts the four corner portions of the rectangular thin sheet 120 so that the thin sheet 120 has a shape as shown in FIG. 11B. At the time the pressing device of the press cutting unit 111 is operated as mentioned above, a pressing device of the press bending unit 112 is also activated to bend the right and left edge portions of the thin sheet 120 which has already been cut by the press cutting unit 111. By the bending operation, the thin sheet 120 is formed to have an approximately ship-like cross-sectional shape as shown in FIG. 11C.

Figure 9:
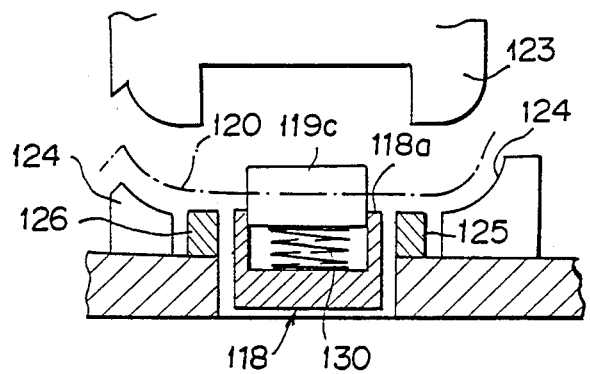
FIGS. 9 and 10 are a partially cutaway elevational view and a side view showing a part of the embodiment shown in FIG. 7, FIGS. 11A to 11D are perspective views showing the steps for forming the cartridge shell plate by the apparatus for making a cartridge shell plate in accordance with the present invention.
Figure 10:
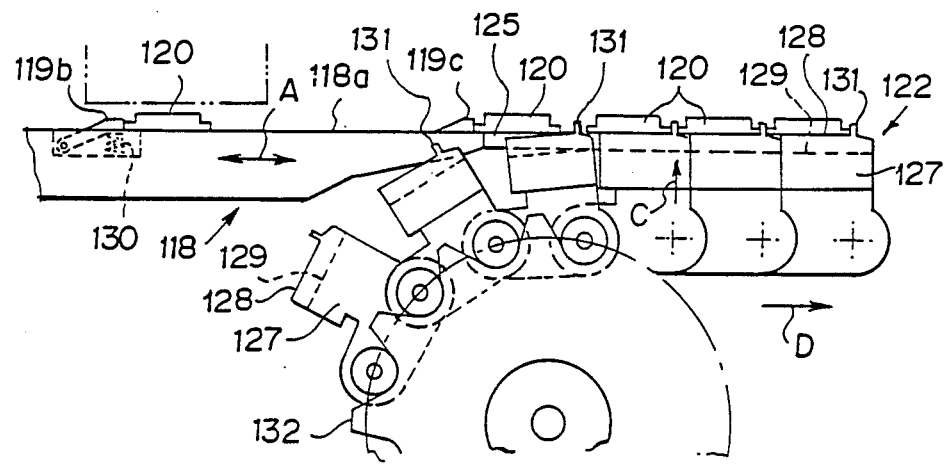

Feeding of the thin sheets 120, 120, . . . and transfer thereof onto the bucket conveyor 122 will hereinbelow be described with reference to FIGS. 9 and 10. FIG. 9 shows the lower section of the press bending unit 112, as viewed in the direction as indicated by the arrow B in FIG. 8, and FIG. 10 shows the feed bar 118 and the bucket conveyor 122. As shown in FIG. 9, the pressing device of the press bending unit 112 is provided with an upper die 123 and lower dies 124, 124, and rails 125 and 126 are disposed between the lower dies 124, 124. The rails 125 and 126 extend from the position below the thin sheet supply unit 110 to the position of entry into a bucket 127 of the bucket conveyor 122. Specifically, as shown in FIG. 10, a recess 129 is formed at the center of a thin sheet supporting surface 128 of each of the buckets 127, 127, . . . , and the rails 125 and 126 extend up to the position as indicated by the arrow C in FIG. 10. The buckets 127, 127, . . . are continuously moved by a sprocket wheel 132 in the direction as indicated by the arrow D. On the other hand, as shown in FIG. 10, the surface of each of the claws 119a, 119b and 119c of the feed bar 118 opposite to the surface coming into contact with the thin sheet 120 is formed obliquely, and each of the claws 119a, 119b and 119c is projected from an upper surface 118a of the feed bar 118 by being urged by a spring 130. When the feed bar 118 returns to its original position after feeding the thin sheets 120, 120, 120 forward, i.e. when the feed bar 118 returns leftward in FIGS. 7 and 8, the claws 119b and 119c come into contact with the thin sheets 120, 120 at the press cutting unit 111 and the press bending unit 112 and are depressed by the thin sheets 120, 120 in the course of passage through the press cutting unit 111 and the press bending unit 112. Therefore, the thin sheets 120, 120 located at the press cutting unit 111 and the press bending unit 112 are not returned toward the thin sheet supply unit 110. The thin sheet 120 fed along the rails 125 and 126 from the press cutting unit 111 to the press bending unit 112 is moved up by guide members (not shown), located on the lower dies 124, 124, and then placed on the rails 125 and 126 when the upper die 123 is moved down.

As shown in FIG. 10, small-diameter bucket claws 131, 131 protrude from the right and left edge portions of the thin sheet supporting surface 128 of each bucket 127. The feed bar 118 feeds the thin sheet 120, which has been formed into the shape as shown in FIG. 11C, onto the bucket 127 up to a position spaced from the position of contact with the bucket claws 131, 131 and returns to the original position. The thin sheet 120 thus fed is pushed by the bucket claws 131, 131 of the next bucket 127 up to the position of contact with the bucket claws 131, 131 of the bucket 127 on which the thin sheet 120 is supported. In this manner, the thin sheets 120, 120, . . . are disposed side by side on the bucket conveyor 122 so that no space or only slight spaces intervene among the thin sheets 120, 120, . . . , and are conveyed continuously in this condition.

In the manner as mentioned above, the thin sheets 120, 120, . . . are continuously conveyed so that right edge portions 120a, 120a, . . . and the left edge portions 120b, 120b, . . . thereof as shown in FIG. 11C are respectively aligned in a line. The thin sheets 120, 120, . . . are thus fed to the adherence unit 114. At the adherence unit 114, continuous length velvet ribbon webs 135a and 135b on which an adhesive has been applied are pushed against the right edge portions 120a, 120a, . . . and the left edge portions 120b, 120b, . . . of the thin sheets 120, 120, . . . by rollers 137, 137, . . . . In this manner, the velvet ribbon webs 135a and 135b are continuously adhered to the right edge portions 120a, 120a , . . . and the left edge portions 120b, 120b, . . . . The thin sheets 120, 120, . . . thus connected by the velvet ribbon webs 135a and 135b are sent to the cutting unit 115. At the cutting unit 115, the velvet ribbon webs 135a and 135b are cut between adjacent thin sheets 120, 120 by, for example, a cutter 138 swung in synchronization with the operation of the bucket conveyor 122. As a result, as shown in FIG. 11D, the thin sheet 120 formed to have an approximately ship-like cross-sectional shape and having velvet ribbons 135a'and 135b'adhered to the right edge portion 120a and the left edge portion 120b is obtained.

The thin sheets 120, 120, . . . provided with the velvet ribbons 135a'and 135b'in the manner as mentioned above are sent to and stacked at the stacking unit 117. The thin sheets 120, 120, . . . are then bent into a cylindrical shape so that the velvet ribbons 135a 'and 135b 'are superposed one upon the other, and used as cartridge shell plates.

An embodiment of the method of making a cartridge shell plate in accordance with the present invention will hereinbelow be described with reference to FIGS. 12 to 15.

Referring to FIG. 12, an apparatus for carrying out the embodiment of the method of making a cartridge shell plate basically comprises a thin sheet supply station 110, a corner portion cutting station 111, a small-diameter bending station 112, a folding station 113, a both-edge bending station 114, thin sheet conveyance rails 115, 115 extending below the stations 110 to 114, and a feed bar 116 intermittently reciprocating in the direction as indicated by the arrow A between the rails 115, 115. The stations 110 to 114 are disposed so that the thin sheets setting sections are at equal intervals.

As shown in FIG. 13, the feed bar 116 is provided with five claws 118, 118, . . . (only one claw 118 is shown in FIG. 13) each of which is projected upward of a upper surface 116a of the feed bar 116 by being urged by a spring 117. The claws 118, 118, . . . are disposed at the same intervals as the intervals of the thin sheet setting sections of the stations 110 to 114. The thin sheet supply station 110 houses a plurality of thin metal sheets 120, 120, . . . stacked one upon another, and the thin sheets 120, 120, . . . are supplied one after another onto the rails 115, 115 and the feed bar 116 by a known supply means (not shown) constituted by an air suction cup or the like. At the time one of the thin sheets 120, 120, . . . is supplied in this manner, the feed bar 116 is maintained stationary at the left end position in FIG. 12, and the thin sheet 120 is supplied to the forward side of the left end claw 118 (i.e. to the right side thereof in FIG. 12). As shown in FIG. 14A, the thin sheet 120 supplied onto the feed bar 116 in this manner has been cut into a rectangular shape so that the length and width dimensions thereof are equal to the developed length and width dimensions of the cartridge shell plate.

After the thin sheet 120 is supplied onto the feed bar 116, the feed bar 116 is moved forward by a distance equal to the intervals of the claws 118, 118, . . . . As a result, the thin sheet 120 which has been supplied to the forward side of the left end claw 118 is pushed and moved forward by the claw 118, and is stopped at a predetermined position in the corner portion cutting station 111. At the time the feed bar 116 is moved in this manner, the thin sheet 120 which has been present in the corner portion cutting station 111 is fed to the small-diameter bending station 112, and the thin sheet 120 which has been present in the small-diameter bending station 112 is fed to the folding station 113. The corner portion cutting station 111 is constituted by a known pressing device, and cuts four corner portions of the rectangular thin sheet 120 so that the thin sheet 120 has a shape as shown in FIG. 14B. Simultaneously with activation of the corner portion cutting station 111 as mentioned above, the small-diameter bending station 112, the folding station 113 and the both-edge bending station 114 are activated.

Figure 15:
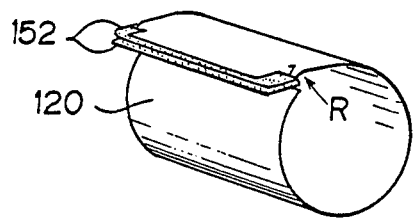
FIG. 15 is a perspective view showing the cartridge shell plate formed by the method of making a cartridge shell plate in accordance with the present invention and then bent into a cylindrical shape.
Figure 16:
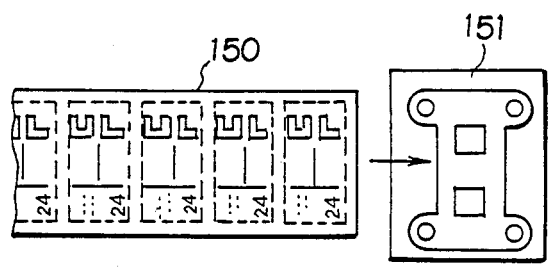
FIGS. 16 and 17 are explanatory views showing the conventional method of making a cartridge shell plate.
Figure 17:
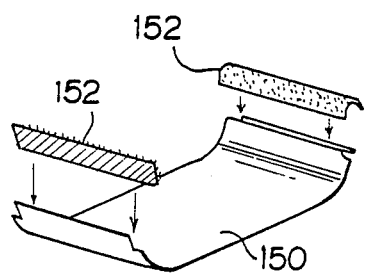

The small-diameter bending station 112 is constituted by a pressing device, and imparts small-diameter bends R, R to two cut corner portions of the thin sheet 120 as shown in FIG. 14c. The bends R, R facilitate fitting of cartridge caps to the thin sheet 120 bent into a cylindrical shape as shown in FIG. 15. The folding station 113 folds the edge portion 120a of the thin sheet 120 and forms the thin sheet 120 into the shape as shown in FIG. 14D. Thereafter, the both-edge bending station 114 bends the edge portion 120a and the other edge portion 120b of the thin sheet 120 into a predetermined shape by press forming.

By the press forming at the both-edge bending station 114, the thin sheet 120 is formed to have an approximately ship-like cross-sectional shape as shown in FIG. 14E. The thin sheets 120, 120, . . . formed in this manner are ejected one after another by the feed bar 116 out of the both-edge bending station 114, and fed into, for example, a velvet ribbon adherence station (not shown), directly or after being stacked one upon another. At the velvet ribbon adherence station, velvet ribbons are adhered to the edge portions 120a and 120b of each thin sheet 120. Then the thin sheet 120 is bent into a cylindrical shape so that velvet ribbons 152, 152 are superposed one upon the other, as shown in FIG. 15. Then a spool around which a film has been wound is inserted into the thin sheet 120 bent cylindrically, and caps are fitted to the thin sheet 120. The bending into the cylindrical shape, insertion of the spool, and fitting of caps are carried out in accordance with a known method.

As shown in FIG. 13, the surface of each of the claws 118, 118, . . . of the feed bar 116 opposite to the surface coming into contact with the thin sheet 120 is formed obliquely. When the feed bar 116 returns to its original position after feeding the thin sheets 120, 120, 120 forward, i.e. when the feed bar 16 returns leftward in FIG. 12, the claws 118, 118, . . . come into contact with the thin sheets 120, 120, . . . at the stations 111 to 114 and are depressed by the thin sheets 120, 120, . . . in the course of passage through the stations 111 to 114. Therefore, the thin sheets 120, 120, . . . located at the stations 111 to 114 are not returned toward the thin sheet supplying station 110.

The folding angle at the folding station 113 may be changed slightly in accordance with the width of the port and the post-processes. In this embodiment, changes of the folding angle can be achieved by changing the link length of the folding station 113.

The small-diameter bending station 112, the folding station 113 and the both-edge bending station 114 may be replaced by a single press forming device. Also in such a case, the four corner cutting shape of the thin sheet 120 can be changed simply by changing the dies at the corner portion cutting station 111. The shapes at the other sections can be changed simply by changing the dies of the press forming device.

With the aforesaid embodiment of the method of making a cartridge shell plate wherein the thin sheet 120 cut to have dimensions equal to the developed length and width dimensions of the cartridge shell plate is used, the cartridge shell plate can be formed from a 3,360mm$^2$ thin sheet 120 in the case of the 135 film. In the case where the cartridge shell plate is formed by use of a general-purpose pressing device as in the conventional method, a 3,486mm$^2$ thin sheet is necessary per cartridge shell plate for the 135 film for example. Thus, with the method in accordance with the present invention, the amount of the thin metal sheets used can be reduced by approximately 3.8% as compared with the conventional method.

We claim:

1. An apparatus for making a cartridge shell plate, which comprises:
   (i) a forming station for cutting thin metal sheets sequentially into a predetermined shape and thereafter bending said thin sheets so that they have an approximately ship-like cross-sectional shape,
   (ii) a feed means for intermittently feeding said thin sheets, which have been processed at said forming station, one after another out of said forming station while maintaining each of said thin sheets in predetermined orientation, and
   (iii) a ribbon adherence station for receiving said thin sheets fed out by said feed means, continuously conveying said thin sheets disposed side by side so that a leading edge of each of said thin sheets contacts or almost contacts a trailing edge of the preceding thin sheet, and adhering velvet ribbons respectively to right and left edge portions of each of said thin sheets.

2. An apparatus as defined in claim 1 wherein said feed means comprises a feed bar intermittently reciprocated and provided with a plurality of claws disposed at predetermined intervals for pushing forward said thin sheets, each of said claws having an oblique surface opposite to a surface coming into contact with said thin sheet and being urged by a spring to protrude from an upper surface of said feed bar.

3. An apparatus as defined in claim 1 wherein said ribbon adherence station is provided with a bucket conveyor composed of a plurality of buckets each for supporting a single thin sheet thereon.

4. An apparatus as defined in claim 3 wherein small-diameter claws are provided to protrude from thin sheet supporting surfaces of said buckets for defining the positions of said thin sheets disposed on said buckets so that the leading edge of each of said thin sheets contacts or almost contacts the trailing edge of the preceding thin sheet.

5. An apparatus as defined in claim 1 wherein each of said thin sheets has length and width dimensions equal to the developed length and width dimensions of said cartridge shell plate.

* * * * *